United States Patent
Lee

(10) Patent No.: US 8,815,407 B2
(45) Date of Patent: Aug. 26, 2014

(54) SLIDING BEARING HAVING IMPROVED LUBRICATION CHARACTERISTICS

(75) Inventor: Choung Rae Lee, Gyeonggi-do (KR)

(73) Assignee: Doosan Infracore Co. Ltd., Incheon (KR)

(*) Notice: Subject to any disclaimer, the term of this patent is extended or adjusted under 35 U.S.C. 154(b) by 0 days.

(21) Appl. No.: 13/885,940

(22) PCT Filed: Nov. 10, 2011

(86) PCT No.: PCT/KR2011/008561
§ 371 (c)(1),
(2), (4) Date: May 16, 2013

(87) PCT Pub. No.: WO2012/067378
PCT Pub. Date: May 24, 2012

(65) Prior Publication Data
US 2013/0236134 A1  Sep. 12, 2013

(30) Foreign Application Priority Data
Nov. 17, 2010 (KR) .................. 10-2010-0114670

(51) Int. Cl.
*F16C 33/06* (2006.01)
*F16C 33/12* (2006.01)
*C22C 38/16* (2006.01)
*B32B 15/00* (2006.01)
*B32B 15/18* (2006.01)

(52) U.S. Cl.
USPC .......... 428/546; 428/566; 428/592; 428/596; 428/681; 428/687; 384/279; 384/292

(58) Field of Classification Search
USPC ......... 428/546, 566, 592, 596, 600, 601, 681, 428/684, 685, 687
See application file for complete search history.

(56) References Cited

U.S. PATENT DOCUMENTS

| RE38,791 E | * | 9/2005 | Shibata et al. | ............... 428/167 |
| RE39,377 E | * | 11/2006 | Kumada et al. | ............... 384/625 |
| 2005/0078894 A1 | * | 4/2005 | Miyasaka et al. | ............. 384/279 |
| 2005/0286822 A1 | * | 12/2005 | Maruyama et al. | ........... 384/283 |

FOREIGN PATENT DOCUMENTS

| JP | 07-259858 | 10/1995 |
| JP | 07-259860 | 10/1995 |
| JP | 10-246230 | 9/1998 |
| JP | 2006-009846 | 1/2006 |
| KR | 10-2004-0081474 | 9/2004 |

OTHER PUBLICATIONS

Search Report dated Jun. 26, 2012 and written in Korean with English translation attached for International Application No. PCT/KR2011/008561 filed Nov. 10, 2011, 5 pages.

* cited by examiner

*Primary Examiner* — Michael E La Villa
(74) *Attorney, Agent, or Firm* — John D. Veldhuis-Kroeze; Westman, Champlin & Koehler, P.A.

(57) ABSTRACT

The present disclosure relates to a sliding bearing which is usefully applicable to equipment to which high surface pressure is applied, by processing an inner surface of a sliding bearing manufactured in the form of a sintered body to be optimized to lubrication characteristics.

3 Claims, 5 Drawing Sheets

SLIDING BEARING HAVING IMPROVED LUBRICATION CHARACTERISTICS

CROSS-REFERENCE TO RELATED APPLICATION

This Application is a Section 371 National Stage Application of International Application No. PCT/KR2011/008561, filed Nov. 10, 2011 and published, not in English, as WO2012/067378 on May 24, 2012.

FIELD OF THE DISCLOSURE

The present disclosure relates to a sliding bearing which is manufactured in a sintered body type and of which a lubrication characteristic is improved, and particularly, to a sliding bearing made of an iron based sintered body, which is suitable for operating in high surface pressure and at a low speed, such as construction machines.

BACKGROUND OF THE DISCLOSURE

In general, industrial machines and construction machines have a plurality of motion units and joint units and bearings are installed at the motion units and the joint units, and typically, a shaft 20 and a sliding bearing 10, which encircles the shaft, are installed at a shaft rotating unit or the joint unit (see FIG. 1).

Lubricant is supplied to the shaft 20 and a sliding bearing 10 device to allow abrasion due to friction generated during motion to be reduced.

In the sliding bearing, densification is maintained by mainly dispersing a large amount of soft copper (Cu) particles on martensite formed of iron (Fe), and in a case in which a lubricating film is broken in a sliding condition of high surface pressure and high temperature, the bearing causes a seizure due to friction with the shaft, which is a counterpart material and made of an iron (Fe) based alloy.

For example, in a case of heavy equipment such as construction machines, high surface pressure is applied to the sliding bearing, and particularly, high surface pressure is applied at the time of motion at a low speed.

When the high surface pressure is applied, the abrasion or the seizure of the sliding bearing may occur due to the friction, as described above.

Therefore, a bearing having excellent abrasion resistance and a good lubrication characteristic is used as a sliding bearing, and lubricant or grease having high viscosity is supplied to a sliding surface where the shaft and the sliding bearing are in contact.

In the related art, a brass or iron based bearing has been mainly used as the sliding bearing, and in recent years, and in recent years, an oilless type of sliding bearing is introduced and used which is able to reduce frictional resistance without frequently supplying lubricant by manufacturing the sliding bearing as a sintered body and then impregnating the manufactured sliding bearing with lubricant.

Specifically, as the sliding bearing, a bearing made of a thermally treated and processed general alloy or a bearing made of a copper alloy or a copper alloy inserted with graphite as lubricant is used.

In recent years, for the purpose of improving a period of supplying lubricant and improving durability, an iron (Fe) based sintered alloy, which is impregnated with lubricant, is used.

In general, the iron (Fe) based sintered alloy sliding bearing undergoes hardening heat treatment in order to improve strength and abrasion resistance and is manufactured using a material in which the copper of about 20 wt. % is dispersed into the constitution.

As an example of the iron based sintered alloy sliding bearing, Korean Patent Application Laid-Open No. 2004-0081474 suggests a sliding bearing of which a surface shape is finished by a cutting processing in order to simplify a process of manufacturing an iron based sintered containing sliding bearing and achieve bearing performance identical to that of the related art.

Korean Patent Application Laid-Open No. 2004-0081474 is characterized in densifying a portion with depth of 10 to 60 μm from a surface layer of an inner circumferential surface and sealing a surface air hole, but a lubricant impregnation ratio is decreased by the densification of the surface layer of the inner circumferential surface and the sealing of the surface air hole, and because an unevenness line is not optimized, an effect of improving lubrication characteristics is slight.

In the above technology, compared to the related art in which only a grinding is performed, there is a difference in that the surface layer of the inner circumferential surface is densified, but the technology is the same as that of the related art in that the surface air hole is sealed, and there is an advantageous point in that lubricant is stored in a concave line according to the unevenness to be supplied to an abrasion surface, but the effect is insignificant.

For this reason, it is necessary to develop a sliding bearing which is usefully applicable to heavy equipment such as construction equipment in which high surface pressure is applied to the sliding bearing, and has an excellent lubricant impregnation ratio.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to provide a sliding bearing which may be usefully applicable to heavy equipment such as construction equipment in which high surface pressure is applied to the sliding bearing.

An aspect of the disclosure is to provide a sliding bearing with an optimized surface shape in which a lubricant impregnation ratio is maximally increased and durability is excellent so that there is no difficulty to be applied to equipment receiving a high load, through an observation of a surface shape and an abrasion state of a sliding bearing made of an iron (Fe) based sintered body of the related art, a processing test, and a friction test.

In addition, another aspect of the disclosure is to provide a surface shape of a sliding bearing capable of increasing air holes opened so as to be advantageous in lubricant impregnation, and more improving lubrication characteristics.

An aspect of the present disclosure provides a sliding bearing 10, which is formed of a porous iron (Fe) based sintered alloy, in which copper is dispersed and contained in the sintered alloy by 13 to 23 wt. %, effective porosity with respect to the whole volume of the sliding bearing is 13 to 23 vol. %, and helical shaped unevenness 13 is formed at an inner circumferential surface 11 of the sliding bearing 10 by a cutting processing. Here, surface roughness Ra of the inner circumferential surface 11 is 2 to 5 μm, a difference in elevation of the unevenness 13 is in the range from to 13 to 30 μm, and an interval of the unevenness 13 is in the range from 200 to 300 μm, and surface air holes are opened without being sealed after the cutting processing.

According to an aspect of the present disclosure, an opened hole area ratio, which is a ratio of an area of the air holes to the whole area of the inner circumferential surface at the inner circumferential surface 11 of the sliding bearing 10, may be 13 to 23%.

The sliding bearing according to an aspect of the disclosure may be particularly usefully applied to a joint unit of construction machine equipment having a working condition in which surface pressure is 3 to 10 kgf/mm² and a sliding speed is 1 to 8 cm/s.

According to an aspect of the present disclosure, at least one type of alloy element selected from a group consisting of Ni, Sn, Mo, W, Mn, and B may be further included in the iron (Fe) based sintered alloy.

The sliding bearing according to an aspect of the present disclosure has the improved lubrication characteristics and thus to be usefully applicable to the equipment to which high surface pressure is applied. The sliding bearing according to an aspect of the present disclosure is particularly and appropriately used for a joint of construction machine equipment in which the sliding bearing is operated by receiving a radial load at the time of sliding.

DESCRIPTION OF MAIN REFERENCE NUMERALS OF DRAWINGS

Figure 1:
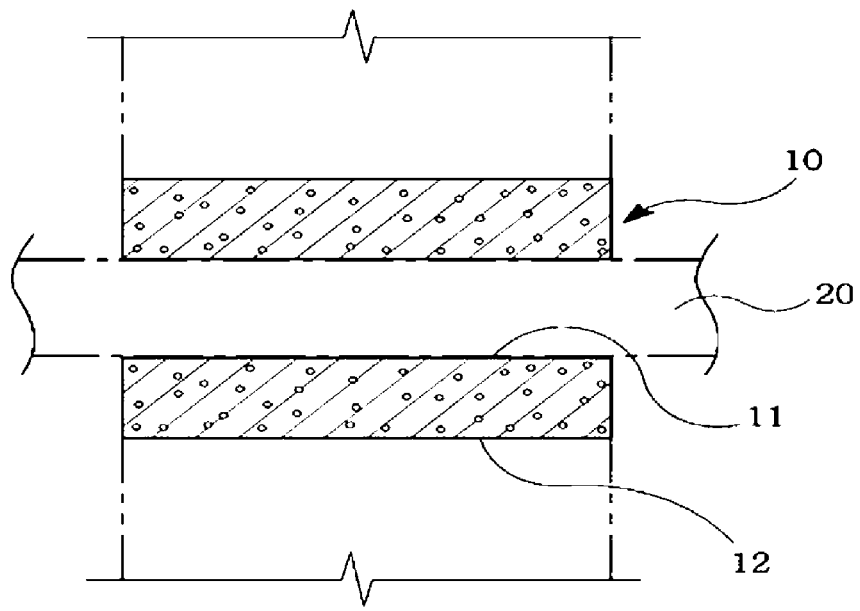
FIG. 1 is a schematic cross-sectional view of an example of a sliding bearing 10 and a shaft 20 which is inserted into the sliding bearing.

10: Sliding bearing
11: Inner circumferential surface
12: Outer circumferential surface
13: Unevenness
20: Shaft

DETAILED DESCRIPTION

Hereinafter, an embodiment of the disclosure will be described in more detail with reference to the drawings.

Because a sliding bearing according to an embodiment of the disclosure requires strength to prevent deformation due to a load and abrasion resistance to prevent sliding abrasion, according to an embodiment of the disclosure, an iron based sintered alloy which underwent hardening heat treatment is used as a material of the sliding bearing.

The material of the sliding bearing according to an embodiment of the disclosure is a material in which copper is dispersed into a main matrix made of an iron based sintered alloy. The copper is useful because the copper may be present in a liquefied state during a sintering process. According to an embodiment of the disclosure, it is suitable that the content of the copper is 13 to 23 wt. %. If the content of the copper is less than 13 wt. %, a shaft is easily abraded due to friction because a property of a hard iron alloy is strong, if the content of the cooper is greater than 23 wt. %, when a processing is performed or a sliding is performed at high surface pressure, the copper is deformed and blocks air holes of the surface, such that there is a risk in that an effect of lubricant impregnation is reduced to increase abrasion.

If necessary, the iron based sintered alloy may further include, as an additional alloy element, at least one type of alloy element selected from a group consisting of Ni, Sn, Mo, W, Mn, and B. The additional alloy element may be changed in accordance with the content of the copper, and by reinforcing the iron based sintered alloy matrix, plastic deformation may be maximally reduced when a processing is performed, thereby preventing the air holes from being blocked.

In the sliding bearing including the iron based sintered alloy matrix, if effective porosity becomes great, lubricant impregnation performance becomes high so that the lubrication characteristics becomes good, but as the porosity is increased, density becomes low, and thereby strength deteriorates and abrasion resistance becomes weak. Therefore, it is important to find effective porosity suitable for use in the sliding bearing.

In general, in the sliding bearing made of an iron based sintered alloy including copper, it has been known that the effective porosity is typically equal to or more than 15%, but in the present disclosure, because the surface shape is optimized, only effective porosity of about 13% may show excellent lubrication characteristics. If the effective porosity is less than 13%, the content of the lubricant is small, such that the lubricant supply to a sliding surface is decreased, and thereby the lifespan of the sliding bearing becomes short. In the present disclosure, because lubrication characteristics are improved by optimizing the shape of the inner circumferential surface, sufficient lubrication characteristics may be shown even when the effective porosity is about 23%. The effective porosity is greater than 23%, there is a concern of deterioration in strength due to deterioration in density.

Figure 2:
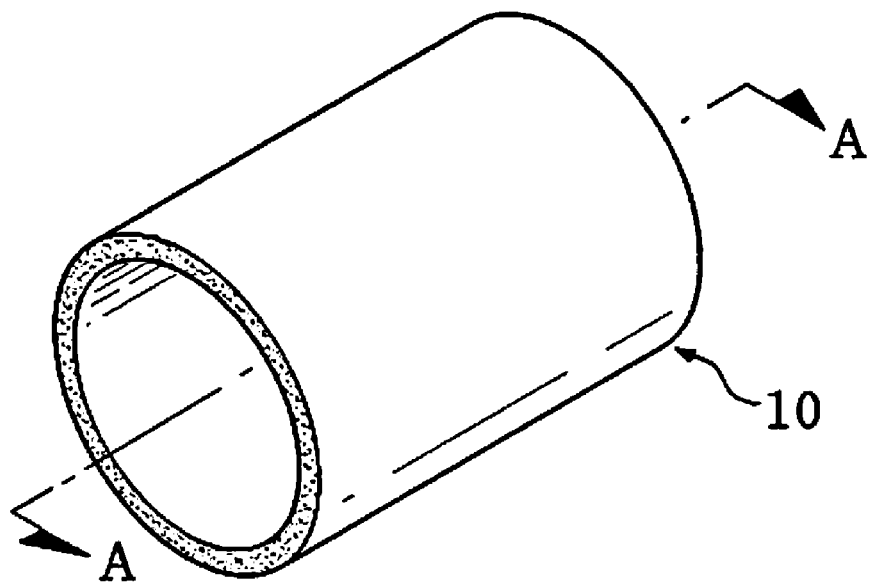
FIG. 2 is a perspective view of the sliding bearing 10 according an aspect of the disclosure.
Figure 3:
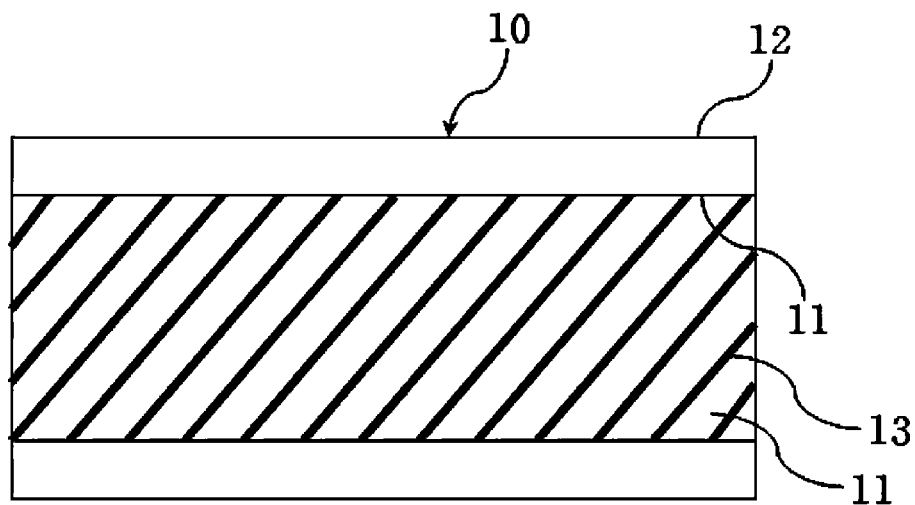
FIG. 3 is a schematic cross-sectional view of the sliding bearing 10 taken along line A-A of FIG. 2.

Unevenness 13 is formed at the inner circumferential surface 11 of the sliding bearing 10 according to an example of the present disclosure which is disclosed in FIG. 2. According to an embodiment of the present disclosure, the unevenness is formed in a helical shape. FIG. 3 illustrates a cross section of the sliding bearing 10 taken along line A-A of FIG. 2. FIG. 3 illustrates that the unevenness 13 is formed at the inner circumferential surface 11 of the bearing 10 to have an inclined line shape, but the unevenness has a helical shape on the cylindrical sliding bearing. FIG. 3 schematically illustrates a cross-section for the convenience of drawing. Here, reference numeral 12 is an outer circumferential surface of the sliding bearing.

The inner circumferential surface 11 of the sliding bearing 10 may be, for example, a cut surface that may be formed by processing equipment such as a lathe on which a work piece is processed while being rotated. A method of forming the unevenness at the inner circumferential surface is not limited.

According to an embodiment of the present disclosure, a minute helical-shaped unevenness line in an axial direction is formed at the inner circumferential surface 11 by performing a cutting processing using a lathe.

According to an example of the present disclosure, a difference in elevation of the unevenness, which is formed as described above, is 13 µm to 30 µm. In addition, an interval of the unevenness along an axial direction is in the range from 200 to 300 µm. Surface roughness Ra of the inner circumferential surface 11 of the sliding bearing 10 where the aforementioned unevenness is formed is adjusted to be in the range from 2 µm to 5 µm. In the related art, when the unevenness line is formed by a simple grinding process or the unevenness line is formed at the inner surface, the surface roughness Ra is equal to or less than 1 µm, but in the present disclosure, the surface roughness Ra of the inner circumferential surface 11 of the sliding bearing 10 is in the range from 2 µm to 5 µm.

Meanwhile, in the related art, by a grinding process, a surface layer portion the inner circumferential surface of the sliding bearing is densified, or even a portion with a depth of 10 to 60 µm from the surface layer of the inner circumferential surface is densified, but there is no separate densification process in the present disclosure, and therefore the air holes at the surface layer portion are not decreased. According to an embodiment of the disclosure, the effective porosity of the sintered body is maintained without sealing the surface air holes by the densification as in the related art, and therefore a opened hole area ratio of a surface is 13 to 23%. Here, the opened hole area ratio refers to a ratio of an area of air holes to the whole area of the inner circumferential surface at the inner circumferential surface 11 of the sliding bearing 10.

The cut surface of the sliding bearing may be repeatedly and stably processed by setting a cutting condition such as a shape of a byte and a transfer speed of a cutting tool after confirming in advance density of a material of the sliding bearing. Therefore, reproducibility is excellent. For reference, machinability of the cut surface greatly depends on the content of the copper, and if the content of the copper is greater than 23 wt. %, processing stability deteriorates, and processing reproducibility deteriorates.

Lubricant or grease may be accumulated in a concave line portion according to the unevenness of the inner circumferential surface of the sliding bearing formed as above, thereby smoothly supplying lubricant to the sliding surface. In addition, because a separate densification process for the surface is not performed in a manufacturing process, there is no decrease in air hole, and thus lubricant is easily impregnated and easily discharged when sliding.

The sliding bearing 10 is impregnated with lubricant. The lubricant impregnated is called "impregnation oil".

The lubricant applied to the impregnation may be used without being limited as long as the lubricant is used in a sliding bearing having high surface pressure. For example, a synthetic oil type of lubricant having excellent thermal stability or an extreme pressure property, a mineral oil type of lubricant into which an extreme pressure additive for improving thermal stability or an extreme pressure property or solid lubricant such as $MoS_2$ is added, or the like may be limitlessly used.

The air holes of the sliding bearing are impregnated with the lubricant. The impregnated lubricant is supplied to the sliding surface due to expansion according to an increase in temperature of the sliding bearing at the time of sliding motion.

Because the increase in temperature at the time of sliding is very high at the initial time of driving, the air holes needs to be opened to allow the impregnation oil to be quickly discharged and to maximize the effect.

The sliding bearing obtained as described above is used with the shaft that is inserted into the sliding bearing. When the shaft is inserted, grease is generally injected.

The assembly of the sliding bearing and the shaft assembled as described above may be usefully used under a condition in which the surface pressure is 3 to 10 $kgf/mm^2$ and the sliding speed is 1 to 8 cm/s.

Particularly, the assembly is suitable for being used a joint unit of equipment for a construction machine and maximizing the lifespan of the joint unit.

The sliding bearing according to the present disclosure may be manufactured by a general method of manufacturing a sliding bearing made of a sintered alloy.

First, sintered alloy powder for a composition of the sliding bearing is prepared. Specifically, iron is a main material, and copper and carbon are included. For example, copper (Cu) of 13 to 20 wt. %, carbon (C) of 0.2 to 2.0 wt. %, and the balance of iron of the total weight may be included.

If necessary, at least one type of alloy element selected from a group consisting of Ni, Sn, Mo, W, Mn, and B may added to the above powder.

For example, the components which are additionally included may be nickel (Ni) of 0.3 to 4 wt. %, tin (Sn) of 1 to 7 wt. %, molybdenum (Mo) of 0.05 to 0.5 wt. %, tungsten (W) of 0.05 to 0.5 wt. %, manganese (Mn) of 0.01 to 0.05 wt. %, and boron (B) of 0.01 to 0.4 wt. %, based on the total weight of the sintered alloy powder.

Only one of the components may be added, or two or more components may be added.

Of course, an additional component other than the aforementioned component may be added.

As the aforementioned component, commercially available products having a powder shape may be used. Here, the powder commercially available for each component may be used, and the powder commercially available in an alloy type may be used.

When the powder in an alloy type is used, it is necessary to calculate the content of each constituent powder in consideration of the content for each component included in the alloy.

For example, in a case of Ni and B, various types of alloy powder products commercially available may be used in which two or more of the aforementioned components are alloyed. In a case of tin (Sn), Cu—Sn alloy powder may be used.

In some cases, a powder product, which is in an alloy type with Cr, Mo, V, W, Mn, Si, or the like, may be used.

The powder prepared as above is mixed by using a wet or dry blending method, and then a formed body is manufactured by a pressing process.

Here, the shape of the formed body is not particularly limited, and the shape of the formed body may be formed to correspond to a shape of a sliding counterpart material.

For example, in a case in which the sliding bearding having a bush shape is manufactured, the formed body may be manufactured in a annular bush shape.

However, the formed body needs to be pressed to have the porosity of 13 to 23 vol. % in consideration of property of the product. At this time, the applied pressing pressure may be about 300 to 5,000 $kg/cm^2$.

Next, the formed body is sintered in a vacuum state or in an air atmosphere to manufacture a sintered body.

The sintering temperature and the sintering time may be changed in accordance of each application purpose.

The sintering process is generally performed by heating in the temperature range from 800 to 1,300° C. for 10 to 90 minutes. The sintering temperature and time may be changed in accordance with a situation.

If necessary, heat treatment may be performed. As an example of the heat treatment, at least one type selected from a group consisting of carburizing heat treatment, nitriding heat treatment, and high frequency heat treatment may be applied. Before or after the heat treatment, the inner circumferential surface of the sliding bearing is processed, and the processed sintered body is impregnated with the lubricant.

Examples 1 to 3 and Comparative Examples 1 to 7

Manufacture of Sliding Bearing

With the compositions described in Table 1, the composition powders for a sliding bearing are prepared, the powders was mixed by using stearic acid based lubricant, and then a formed body having an annular bush shape was manufactured by pressing the powders at a pressure of 3,000 kg/cm².

As the powders of the components described in Table 1, commercially available products were used. For example, the iron powder was Hoganas's powder, a copper and copper-tin alloy (Cu30Sn; copper-tin alloy containing tin of 30 wt. %) was a powder by ChangSung, Inc., C was a graphite product on the market, Ni and B were Hoganas's B—Ni product, and Mo, W, Mn were steel metal powders.

As Comparative Examples 1 and 2, the sliding bearing was manufactured with the same component contents as that of Example 1. Comparative Examples 1 and 2 are different from the Example in forming the unevenness.

TABLE 1

| Compositions of Example and Comparative Example (wt. %) | | | | | | | | | | | |
|---|---|---|---|---|---|---|---|---|---|---|---|
| Component | | | | | | | | | | | |
| | Fe | Cu | Cu30Sn | C | Ni | B | Si | Cr | Mo | V | W | Mn |
| Example 2 | Bal. | 15 | 5 | 1 | 0.5 | 0.1 | 0.03 | 0.05 | — | — | — | — |
| Example 1 | Bal. | 18 | — | 1 | — | — | — | — | — | — | — | — |
| Example 3 | Bal. | 10 | 10 | 1 | — | 0.2 | — | — | — | — | — | — |
| Example 4 | Bal. | 10 | 10 | 1 | 1.2 | 0.2 | 0.1 | 0.3 | 0.3 | 0.1 | 0.3 | 0.03 |
| Comparative Example 1 | Bal. | 15 | 5 | 1 | 0.5 | 0.1 | 0.03 | 0.05 | — | — | — | — |
| Comparative Example 2 | Bal. | 15 | 5 | 1 | 0.5 | 0.1 | 0.03 | 0.05 | — | — | — | — |

In Examples 1 to 4 and Comparative Example 2 among the sliding bearings manufactured as described above, the inner circumferential surfaces of the sliding bearings were processed to form the unevenness.

In Comparative Example 1, the unevenness was not formed. The processing condition for the inner circumferential surface, which was performed in Comparative Example 2, is different from that of Example 1.

After the processing of the inner circumferential surface, surface roughness Ra with respect to Example 1, Comparative Example 1, and Comparative Example 2, a difference in elevation of the surface of the inner circumferential surface, an interval of the unevenness, and an opened hole area ratio, which is a ratio of an area occupied by the air holes to the whole area of the inner circumferential surface at the inner circumferential surface 11 of the sliding bearing 10, were measured two times. The results are as the following Table 2.

TABLE 2

| | Comparative Example 1 | | Comparative Example 2 | | Example 1 | |
|---|---|---|---|---|---|---|
| | first | second | first | second | first | second |
| Ra (µm) | 0.34 | 0.42 | 1.01 | 0.91 | 3.56 | 3.76 |
| Difference in elevation (µm) | 1.6 | 2.5 | 7.9 | 6.7 | 18.0 | 19.1 |
| Interval of unevenness (µm) | — | — | 504 | 490 | 285 | 290 |
| Surface opened hole area ratio (%) | 2.7% | 3.1% | 7.4% | 8.3% | 18.0% | 17.1% |

In Comparative Example 1, even though the unevenness is not processed, there is a difference in elevation in the inner circumferential surface, and therefore the difference in elevation was measured. However, an interval of the unevenness was not measured.

The surface roughness Rs is an arithmetic mean surface roughness measured according to the Korean Standard.

Figure 4:
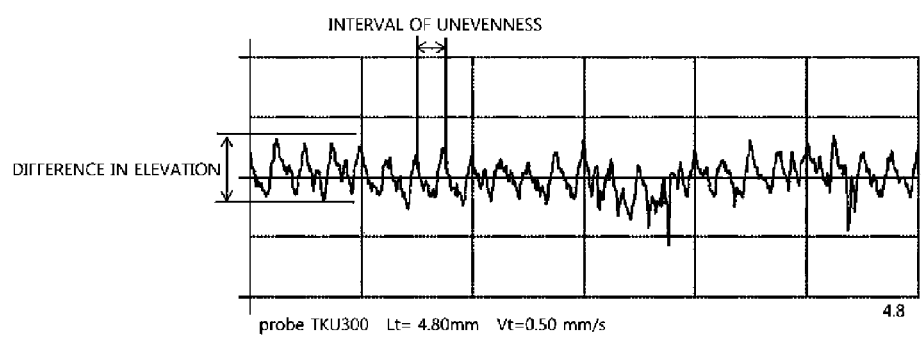
FIG. 4 is a view illustrating a height of a surface of an inner circumferential surface 11 measured along an axial direction at the inner circumferential surface 11 of the sliding bearing 10 according to an example (Example 1) of the present disclosure, and shows a difference in elevation of the surface at the inner circumferential surface (difference in elevation of unevenness) and intervals of the unevenness.

FIG. 4 illustrates the difference in elevation of the surface and an interval of the unevenness measured with respect to Example 1.

FIG. 4 is a view illustrating a height of a surface of the inner circumferential surface 11 measured along an axial direction at the inner circumferential surface 11 of the sliding bearing 10 in Example 1, and a difference in elevation of the surface at the inner circumferential surface (difference in elevation of the unevenness) and an interval of the unevenness may be known. In a case of Comparative Examples 1 and 2, there is a difference in value, but a graph regarding the difference in elevation is obtained in a similar aspect.

Figure 5:
FIG. 5 is a surface photograph of the inner circumferential surface 11 of the sliding bearing 10 according to an example (Example 1) of the present disclosure.
Figure 6:
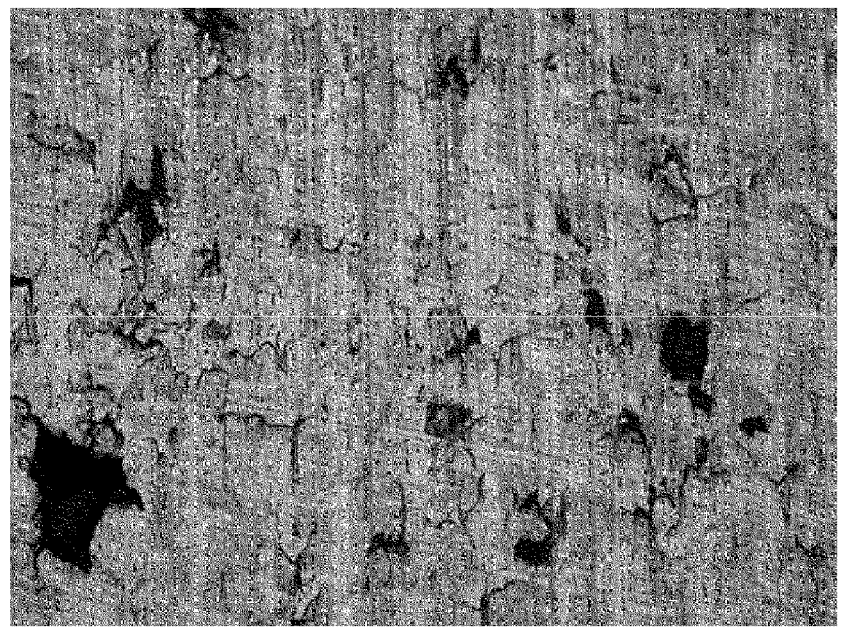
FIG. 6 is a surface photograph of an inner circumferential surface 11 of the sliding bearing 10 manufactured by Comparative Example 2.

FIG. 5 illustrates a surface photograph of the inner circumferential surface 11 of the sliding bearing 10 according to an example (Example 1), and FIG. 6 illustrates a surface photograph of an inner circumferential surface 11 of the sliding bearing 10 manufactured by Comparative Example 2A difference in the inner circumferential surfaces may be confirmed from the above drawings.

Experimental Example

Test for Performance of Bearing

Next, a bearing performance test was performed. In the bearing performance test, the sliding bearing manufactured in Example 1 and Comparative Examples 1 and 2 was fixed to a housing, and grease was applied on inner circumferential surfaces of the sliding bearing and the housing, and grease was applied on a shaft which was subjected to high frequency heat treatment, the shaft was fitted in to the sliding bearing, and a load in a radial direction was applied to the shaft from a lower side to an upper side.

At this time, the surface pressure was 6 kgf/mm$^2$, a speed was 3 cm/s, and the measurement was performed while fluctuating the sliding bearing at a range of 90°. The test was finished when a friction coefficient was 0.3.

Figure 7:
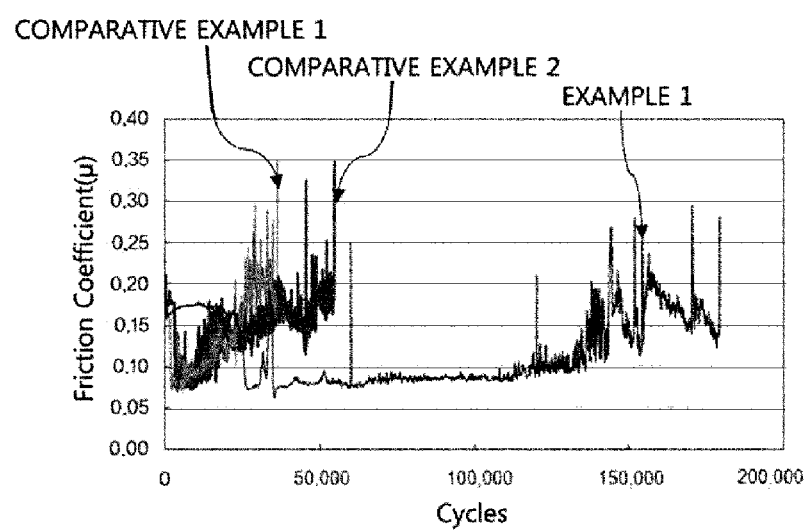
FIG. 7 is a graph depicting the friction coefficient versus cycles for Comparative Examples 1 and 2 and for Example 1.

The friction coefficient was determined as a torque at a time point when the friction performance of the bearing is finished and the bearing gets scorched and stick, and a reference was determined. The result is illustrated in FIG. 7.

According to the experimental result, the sliding bearing according to the present disclosure (Example 1) showed an improvement in performance twice of Comparative Examples 1 and 2.

The result shows that the initial coefficient of friction of the sliding bearing according to the present disclosure is maintained in a high level and for a long time, consequently, a stabilized section are increased by more than two times, and thus the overall friction performance is improved.

The reason why the initial coefficient of friction of the sliding bearing according to the present disclosure is maintained in a high level and for a long time is that because the surface roughness Ra and the difference in elevation are greater than those of the sliding bearing according to Comparative Example, it needs a long time for the initial stabilization.

However, it is determined that in the sliding bearing according to the present disclosure, the opened hole ratio of the air holes and the interval of the unevenness lines are harmonized so that the stabilized section is lengthened, and thereby lubrication effect and friction performance are improved.

The sliding bearing according to an aspect of the disclosure may be used for a motion unit and a joint unit to which high surface pressure and low speed motion are applied.

Although the present disclosure has been described with reference to exemplary and preferred embodiments, workers skilled in the art will recognize that changes may be made in form and detail without departing from the spirit and scope of the disclosure.

The invention claimed is:

1. A sliding bearing for use with a construction equipment, which comprises a porous iron (Fe) based sintered alloy, wherein:
   copper is dispersed and contained in the sintered alloy by 13 to 23 wt. %;
   effective porosity with respect to the whole volume of the sliding bearing is 13 to 23 vol. %;
   helical shaped unevenness is formed at an inner circumferential surface of the sliding bearing;
   surface roughness Ra of the inner circumferential surface is 2 to 5 μm;
   a difference in elevation of the unevenness is in the range from 13 to 30 μm;
   an interval of the unevenness is in the range from 200 to 290 μm; and
   surface air holes are opened;
   wherein an opened hole area ratio, which is a ratio of an area of the air holes to the whole area of the inner circumferential surface at the inner circumferential surface of the sliding bearing, is 13 to 23%.

2. The sliding bearing of claim 1, wherein the sliding bearing is for use with a joint unit of construction equipment having a working condition in which a surface pressure is 3 to 10 kgf/mm$^2$ and a sliding speed is 1 to 8 cm/s.

3. The sliding bearing of claim 1, wherein at least one type of alloy element selected from a group consisting of Ni, Sn, Mo, W, Mn, and B is further included in the iron (Fe) based sintered alloy.

* * * * *